US008717621B2

(12) United States Patent
Yamauchi

(10) Patent No.: US 8,717,621 B2
(45) Date of Patent: May 6, 2014

(54) IMAGE FORMATION CONTROL APPARATUS, IMAGE FORMING SYSTEM, IMAGE FORMATION CONTROL METHOD, AND STORAGE MEDIUM STORING IMAGE FORMATION CONTROL PROGRAM

(75) Inventor: Manabu Yamauchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 13/182,502

(22) Filed: Jul. 14, 2011

(65) Prior Publication Data

US 2012/0019847 A1  Jan. 26, 2012

(30) Foreign Application Priority Data

Jul. 20, 2010 (JP) ................. 2010-163251

(51) Int. Cl.
G06F 3/12 (2006.01)
H04N 1/203 (2006.01)
(52) U.S. Cl.
CPC .................. *H04N 1/2032* (2013.01)
USPC ......................... 358/1.9; 358/1.12
(58) Field of Classification Search
USPC ......................... 358/1.9, 468, 500
See application file for complete search history.

(56) References Cited

U.S. PATENT DOCUMENTS

| 4,791,492 | A  | * | 12/1988 | Nagashima et al. | 358/409 |
| 7,221,465 | B1 | * | 5/2007 | Shimada | 358/1.14 |
| 7,304,753 | B1 | * | 12/2007 | Richter et al. | 358/1.15 |
| 2009/0161148 | A1 | * | 6/2009 | Okada | 358/1.15 |
| 2010/0118328 | A1 | * | 5/2010 | Sakuraba | 358/1.14 |
| 2011/0217050 | A1 | * | 9/2011 | Harada | 399/9 |

FOREIGN PATENT DOCUMENTS

JP  2006-058881 A  3/2006

OTHER PUBLICATIONS

Tadaaki Saida; U.S. Appl. No. 12/986,489; filed Jan. 7, 2011; Specification, Claims, Abstract and Drawings provided.

* cited by examiner

*Primary Examiner* — Jerome Grant, II
(74) *Attorney, Agent, or Firm* — Rossi, Kimms & McDowell LLP

(57) ABSTRACT

An image formation control apparatus capable of reducing vain power consumption of an image forming apparatus that cannot continue printing. The image formation control apparatus executes a print job by controlling a first image forming apparatus and a second image forming apparatus connected to a downstream side of the first image forming apparatus. A determination unit determines whether the first image forming apparatus is able to execute the print job based on status information about the first image forming apparatus. A control unit shifts the first image forming apparatus to a power saving mode and controls the second image forming apparatus to execute the print job when the determination unit determines that the first image forming apparatus cannot execute the print job.

12 Claims, 12 Drawing Sheets

PRODUCTIVITY                  \<UNIT: SHEETS/MINUTE\>

| PRINT TYPE \ SYSTEM CONFIGURATION | SINGLE APPARATUS | CONNECTED SYSTEM |
|---|---|---|
| ONE SIDE PRINT | 100 | 100 |
| DOUBLE-SIDED PRINT | 50 | 100 |

IMAGE FORMATION CONTROL APPARATUS, IMAGE FORMING SYSTEM, IMAGE FORMATION CONTROL METHOD, AND STORAGE MEDIUM STORING IMAGE FORMATION CONTROL PROGRAM

BACKGROUND OF THE INVENTION

1. Field of the Invention

The present invention relates to an image formation control apparatus, an image forming system, an image formation control method, and a storage medium storing an image formation control program, which are applied to printing by two connected image forming apparatuses.

2. Description of the Related Art

Conventionally, an image forming apparatus is controlled as follows to print images on both sides of a recording sheet. First, the recording sheet fed from a sheet feeding unit of the image forming apparatus is conveyed to an image forming unit, an image is formed on a first side (a front side) of the recording sheet, and the image is fixed by heat onto the recording sheet by a fixing unit. Then, the recording sheet is inverted by an inverting mechanism installed in a conveyance path, the inverted recording sheet is again conveyed to the image forming unit, an image is formed on a second side (a back side) of the recording sheet, and the image is fixed by heat onto the recording sheet.

When the images are printed on both the sides of the recording sheet according to the above-mentioned control, the recording sheet is circularly conveyed within the unit in general. Therefore, as shown in FIG. 13, when an image forming apparatus is used alone, productivity (the number of the recording sheets ejected per unit time) for double-sided print is half the productivity for one side print.

Thus, a connected image forming system, which connects two image forming apparatuses to perform a print operation, has been proposed to increase the productivity of the double-sided print with a simple method (for example, see Japanese Laid-Open Patent Publication (Kokai) No. 2006-58881 (JP 2006-58881A)). In the connected image forming system, a first image forming apparatus at the upstream side (a first stage) forms and fixes an image onto a first side of a recording sheet. Then, the recording sheet is inverted and is conveyed to a second image forming apparatus at the downstream side (a second stage). The second image forming apparatus forms and fixes an image onto a second side of the recording sheet, and ejects the sheet from the apparatus.

The connected image forming system increases the productivity, which is converted to the output number of recording sheets, for the double-sided print so as to be almost equal to the productivity for the one side print sheet, as shown in FIG. 13.

When the first image forming apparatus cannot continue to print, the connected image forming system is able to execute double-sided print only by the second image forming apparatus. When the first image forming apparatus cannot feed a recording sheet, when toner is empty, or when a waste toner container that collects used waste toner is full etc., the first image forming apparatus cannot continue printing.

However, since the conventional connected image forming system supplies electric power to the first image forming apparatus that cannot continue printing even when executing the double-sided print only by the second image forming apparatus, there was a problem of consuming energy vainly.

SUMMARY OF THE INVENTION

The present invention provides an image formation control apparatus, an image forming system, an image formation control method, and a storage medium storing an image formation control program, which are capable of reducing vain power consumption of an image forming apparatus that cannot continue printing.

Accordingly, a first aspect of the present invention provides an image formation control apparatus that executes a print job by controlling a first image forming apparatus and a second image forming apparatus connected to a downstream side of the first image forming apparatus, comprising a determination unit configured to determine whether the first image forming apparatus is able to execute the print job based on status information about the first image forming apparatus, and a control unit configured to shift the first image forming apparatus to a power saving mode and to control the second image forming apparatus to execute the print job when the determination unit determines that the first image forming apparatus cannot execute the print job.

Accordingly, a second aspect of the present invention provides an image formation control method for an image formation control apparatus that executes a print job by controlling a first image forming apparatus and a second image forming apparatus connected to a downstream side of the first image forming apparatus, the control method comprising a determination step of determining whether the first image forming apparatus is able to execute the print job based on status information about the first image forming apparatus, and a control step of shifting the first image forming apparatus to a power saving mode and of controlling the second image forming apparatus to execute the print job when it is determined that the first image forming apparatus cannot execute the print job in the determination step.

Accordingly, a third aspect of the present invention provides a non-transitory computer-readable storage medium storing an image formation control program causing a computer to execute the control method for the image formation control apparatus according to the second aspect.

According to the present invention, when the first image forming apparatus becomes impossible to execute a print job, the print job is executed only by the second image forming apparatus, and the first image forming apparatus is shifted to the power saving mode. Accordingly, this enables to achieve both of the continuous execution of the print job, and the energy saving by reducing the vain power consumption.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
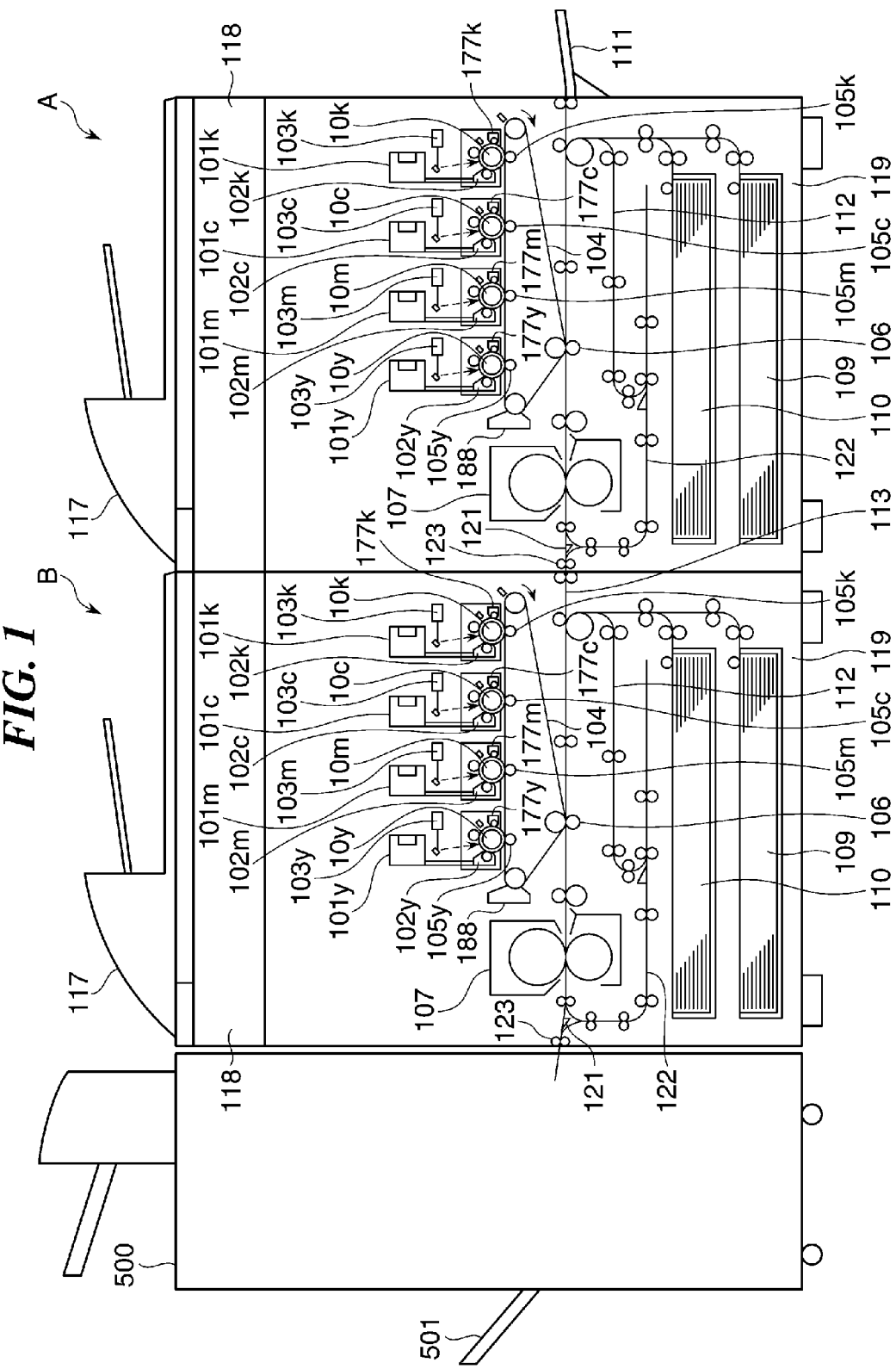
FIG. 1 is a configuration view showing a connected image forming system according to an embodiment of the present invention.

FIG. 1 is a configuration view showing a connected image forming system according to an embodiment of the present invention.

In FIG. 1, the connected image forming system consists of two image forming apparatuses A and B, and a post-processing device 500, which are connected. In this embodiment, the image forming apparatus A (the first image forming apparatus) is described as the upstream side (the first stage), and the image forming apparatus B (the second image forming apparatus) is described as the downstream side (the second stage). Each of the image forming apparatuses A and B is provided with an original feeding unit 117, an image reader unit 118, and a printer unit 119. The same reference numerals are given to common parts of the image forming apparatuses A and B.

First, a basic configuration and an image forming operation of the image forming apparatus A at the upstream side will be described. The original feeding unit 117 sequentially conveys originals set on an original feeder one by one from the head page to a platen glass via a curved path, and ejects the originals to an original ejection tray. When an original passes over a reader scanner unit held in a predetermined position, an image on the original is read. At the time of passage of the original, the reader scanner unit irradiates the original, and guides the reflected light from the original to an image sensor via a mirror (these are not shown).

The printer unit 119 is provided with photosensitive drums 10y, 10m, 10c, and 10k, toner supply units 101y, 101m, 101c, and 101k, development devices 102y, 102m, 102c, and 102k, exposure control units 103y, 103m, 103c, and 103k, primary transfer sections 105y, 105m, 105c, and 105k, etc. The subscripts "y", "m", "c" and "k" correspond to colors of yellow, magenta, cyan, and black, respectively, and they will be omitted hereafter. The toner supply units 101y, 101m, 101c, and 101k are filled with yellow toner, magenta toner, cyan toner, and black, respectively. When copying the original, an image process is applied to image data read by the image sensor, and the processed image data is sent to the exposure control unit 103. A laser beam outputted by the exposure control unit 103 irradiates the photosensitive drum 10 to form an electrostatic latent image thereon.

The electrostatic latent image on the photosensitive drum 10 is developed as a toner image by the development device 102, and is transferred to an intermediate transfer belt 104 by the primary transfer section 105. Residual toners on the photosensitive drums 10y, 10m, 10c, and 10k without being transferred to the intermediate transfer belt 104 are recovered by cleaners 177y, 177m, 177c, and 177k. Each cleaner 177 is equipped with a waste toner container (not shown) that stores the recovered waste toner. The toner image on the intermediate transfer belt is transferred by a secondary transfer section 106 onto the recording sheet fed from one of sheet cassettes 109 and 110, a manual feeder 111, and a double-sided conveyance path 112. Residual toner on the intermediate transfer belt 104 without being transferred to the recording sheet is recovered by a cleaner 188. The cleaner 188 is equipped with a waste toner container (not shown) that stores the recovered waste toner. The recording sheet on which the toner image is transferred is sent to a fixing unit 107, which fixes the toner image.

The recording sheet that passed the fixing unit 107 is once guided to an inverting path 122 by a flapper 121, is transferred in the reverse direction after the rear edge of the recording sheet goes past the flapper 121, and is guided to a ejection roller 123 by the flapper 121. Accordingly, the recording sheet is ejected from the printer unit 119 by the ejection roller 123 so that its toner transfer face points downward. When the recording sheet is ejected so that its toner transfer face upward, the recording sheet is directly guided to the ejection roller 123 without guiding to the inverting path 122, and is ejected from the printer unit 119.

The image forming apparatus B is able to form images onto both sides (first and second sides) of the recording sheet. The recording sheet that the image has been formed on its first side by the image forming apparatus A is transferred from the ejection roller 123 of the image forming apparatus A to the image forming apparatus B via a connection path 113 of the image forming apparatus B. The image forming apparatus B forms an image on the first side or the second side of the recording sheet received from the image forming apparatus A. That is, the image forming apparatus B forms an image on the second side of the recording sheet (double-sided print), or forms an image on the first side of the recording sheet (composite print).

In the case of the double-sided print, the image forming apparatus A inverts the recording sheet on which the image has been formed, and transfers it to the image forming apparatus B. In the case of the composite print, the image forming apparatus A transfers the recording sheet to the image forming apparatus B without inverting. Details of the double-sided print and the composite print will be mentioned later.

The recording sheet on which the image has been formed by the image forming apparatus B is transferred to the post-processing device 500. The post-processing device 500 applies a required post-process to the recording sheet, and ejects it to a sheet ejection tray 501. Since the configuration and operation of the image forming apparatus B are the same as that of the image forming apparatus A, their descriptions are omitted. Since the configuration and operation of the post-processing device 500 are not related to the main point of the present invention, its description is omitted.

This embodiment describes the image forming operation of the full color print using the color toners. In the case of a monochrome print, only the black toner is used.

Figure 2:
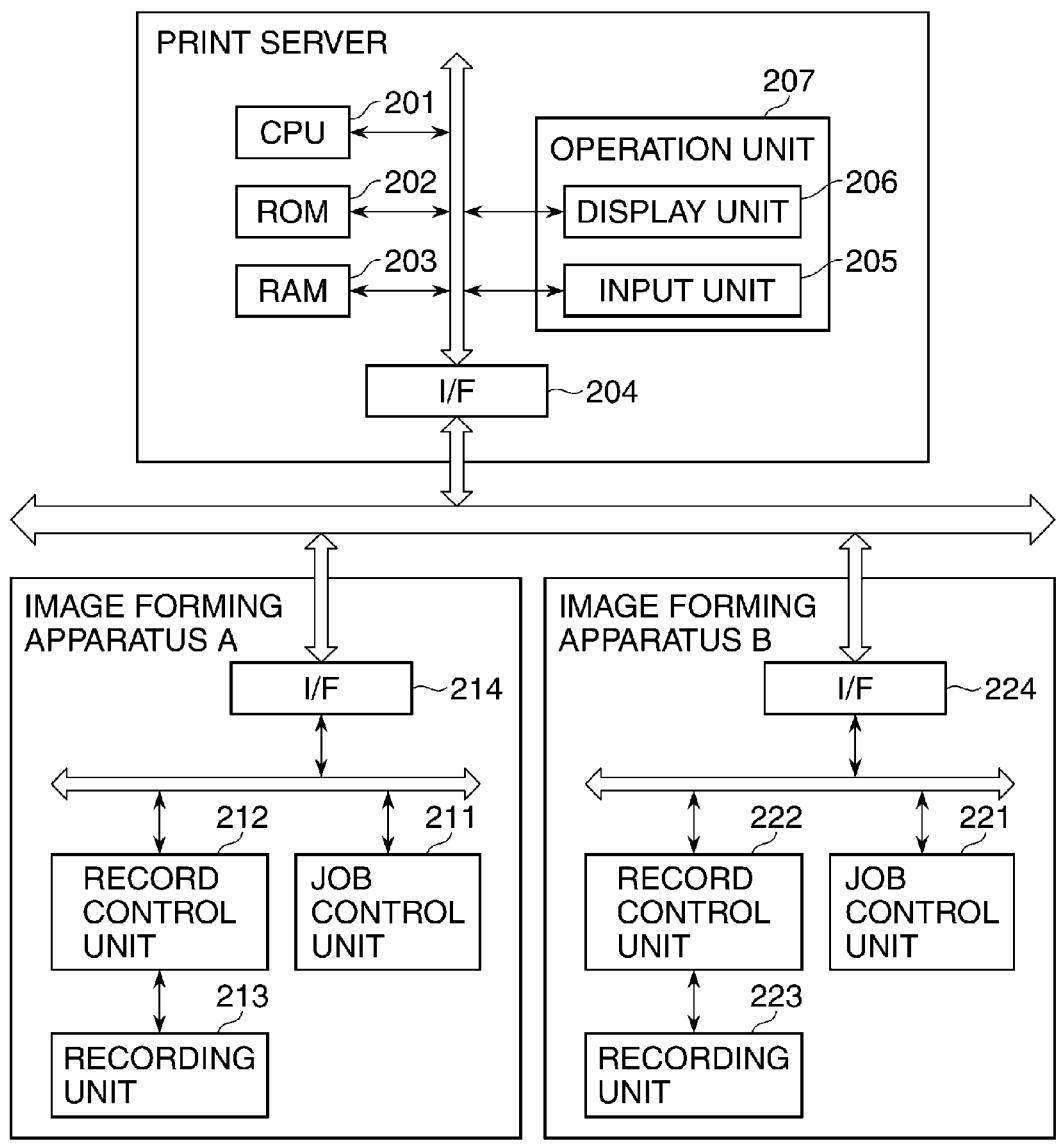
FIG. 2 is a block diagram schematically showing electric configurations of two image forming apparatuses, which constitute the connected image forming system in FIG. 1, and a print server.

FIG. 2 is a block diagram schematically showing electric configurations of the two image forming apparatuses A and B, which constitute the connected image forming system in FIG. 1, and a print server.

In FIG. 2, the print server 200 as an image formation control apparatus is provided with a CPU 201, a ROM 202, a RAM 203, an interface (I/F) unit 204, and an operation unit 207. The CPU 201 controls the entire image forming apparatus. The ROM 202 stores a control program executed by the CPU 201. The RAM 203 has a working area that is required when the CPU 201 controls the image forming apparatus. The RAM 203 has a storage area for storing digital image data read from the original by the image reader unit 118, digital image data transmitted from the outside of the image forming apparatus through the I/F unit 204, etc. The RAM 203 is used also as a working area for applying an image process to the digital image data obtained from the image reader unit 118 or the I/F unit 204.

The operation unit 207 comprises an input unit 205 and a display unit 206, and can set a copy job that a user wants to be executed by the image forming apparatus. An image of an original read in the copy job is stored in the RAM 203.

The I/F unit 204 is connected with a network like the TCP/IP. The print server 200 receives an execution instruction for a print job transmitted from a computer connected to the network via the I/F unit 204, and notifies the computer of the information about the image forming apparatus. In response to the copy job setting (setting about single side print/double-side print, etc.) from the operation unit 207 and the information about the read image from the image reader unit 118, the CPU 201 applies a required image process to the digital image, and stores the digital image data as a target of image formation into the RAM 203. Although the print server 200 is installed in one of the image forming apparatuses A and B, it may be installed in a separate enclosure from the image forming apparatuses A and B.

The image forming apparatus A is provided with a job control unit 211, a record control unit 212, a recording unit 213, and an I/F unit 214. The image forming apparatus B is provided with a job control unit 221, a record control unit 222, a recording unit 223, and an I/F unit 224. In the image forming apparatus A, when receiving a print job from the print server 200 via the I/F unit 214, the job control unit 211 analyzes the job. The record control unit 212 operates the recording unit 213 according to an instruction from the job control unit 211 so as to form an image. The recording unit 213 names generically the configuration of a recording system (an image formation system) including the photosensitive drum 10, the toner supply unit 101, the development device 102, the exposure control unit 103, the intermediate transfer belt 104, the primary transfer section 105, the secondary transfer section 106, and the fixing unit 107, which are shown in FIG. 1. Since the configuration of the image forming apparatus B is the same as that of the image forming apparatus A, its description is omitted.

Next, an operation of the connected image forming system of this embodiment with the above-mentioned configuration will be described with reference to FIG. 3 through FIG. 12. First, a power saving control in this embodiment will be described.

During an image forming operation or during standby mode in preparation for image formation, each of the image forming apparatuses A and B consumes electric power for a holding current of a stepping motor that constitutes a drive system of each image forming apparatus, and for a temperature control of the fixing unit 107. On the other hand, in a power saving mode, the electric power is supplied only to a part of the control system of the image forming apparatus. The electric power to loads such as the stepping motor and a heater is stopped to reduce power consumption.

In the power saving mode, the CPU 201 of the print server 200 issues instructions (power saving shift commands) to the job control unit 211 of the image forming apparatus A and the job control unit 221 of the image forming apparatus B, and controls the power supply conditions of the image forming apparatuses. The image forming apparatus shifts to the power saving mode when a user inputs a command through the operation unit of the print server 200. Further, the image forming apparatus automatically shifts to the power saving mode after a lapse of a predetermined period that is set to a timer of the CPU 201 of the print server 200.

The power saving control starts when the print server 200 issues the power saving shift commands to the image forming apparatuses A and B via the I/F unit 204. Similarly, the image forming apparatuses return from the power saving mode to the standby mode, when the print server 200 issues power-saving return commands to the image forming apparatuses A and B according to the user's input through the operation unit of the print server 200 via the I/F unit 204.

Next, the double-sided print operation using the connected image forming apparatuses A and B will be described with reference to the flowcharts in FIG. 3 through FIG. 5. In the double-sided print operation by the connected image forming apparatuses A and B (referred to as a connected double-sided operation, hereafter), the image forming apparatus A prints a front side image on a first side of a recording sheet, and the image forming apparatus B prints a back side image on a second side of the recording sheet.

Figure 3:
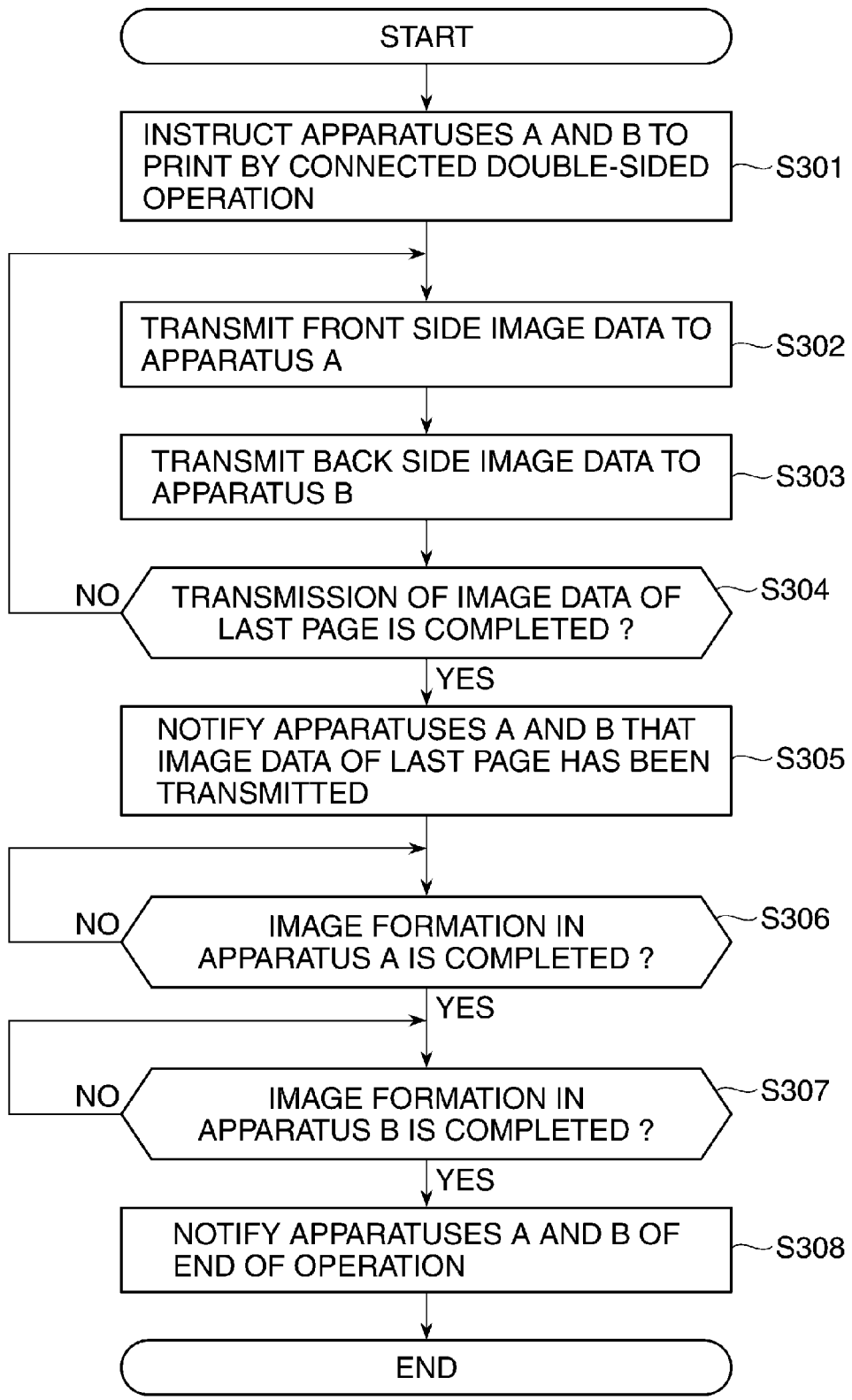
FIG. 3 is a flowchart showing an operation of the print server in the case of performing double-sided print of a recording sheet using the two image forming apparatuses included in the connected image forming system in FIG. 1.

FIG. 3 is a flowchart showing an operation of the print server 200 in the case of performing the double-sided print using the connected image forming apparatuses A and B.

In FIG. 3, the CPU 201 of the print server 200 instructs the image forming apparatus A and the image forming apparatus B to print by the connected double-sided operation first (step S301). Then, the CPU 201 transmits front side image data that is printed on the first side of the recording sheet among the target image data of the connected double-sided operation to the image forming apparatus A at the upstream side (step S302). In the same manner, the CPU 201 transmits back side image data that is printed on the second side of the recording sheet to the image forming apparatus B at the downstream side (step S303).

When ejecting a recording sheet facedown to the sheet ejection tray 501, the CPU 201 transmits the image data of odd-numbered pages to the image forming apparatus A in ascending order from the first page, and transmits the image data of even-numbered pages to the image forming apparatus B in ascending order from the second page. On the other hand, when ejecting a recording sheet face up to the sheet ejection tray 501, the CPU 201 transmits the image data of even-numbered pages to the image forming apparatus A in descending order from the last even-numbered page, and transmits the image data of odd-numbered pages to the image forming apparatus B in descending order from the last odd-numbered page. The following description assumes that the sheet is ejected facedown.

Then, the CPU 201 determines whether transmission of the image data of the last page of the print job is completed (step S304), and repeats to transmit image data in the steps S302 and S303 until the transmission of the image data of the last page of the print job is completed.

When determining that the transmission of the image data of the last page is completed in the step S304, the CPU 201 notifies the image forming apparatuses A and B that the transmission of the image data of the last page has been completed (step S305). Then, the CPU 201 waits to receive a notification of image formation completion from the image forming apparatus A (step S306), and waits to receive a notification of image formation completion from the image forming apparatus B (step S307). When receiving the notifications of the image formation completion from both of the image forming apparatuses A and B, the CPU 201 notifies the image forming apparatuses A and B of the end of the connected double-sided operation (step S308), and finishes the process.

Figure 4:
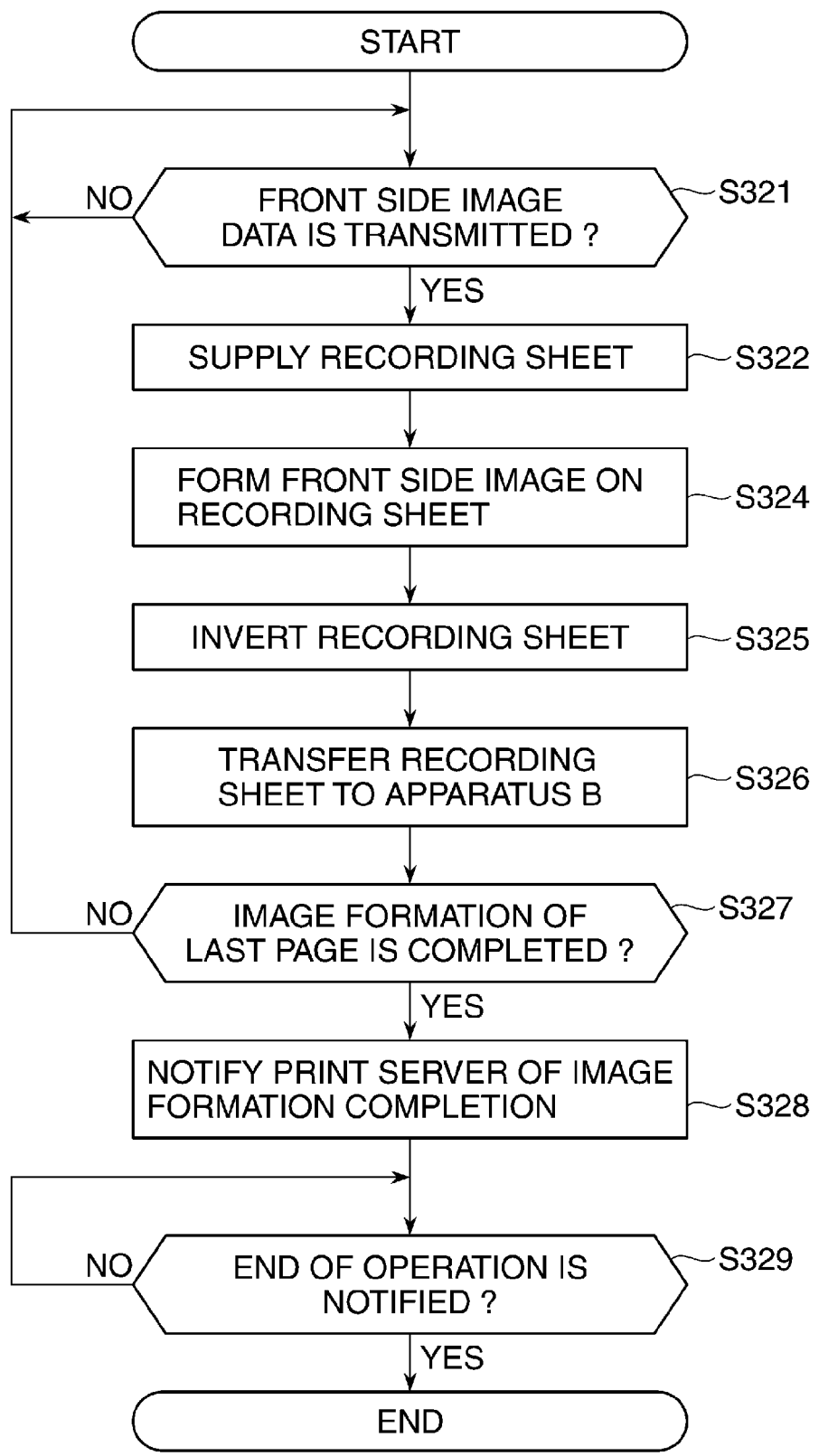
FIG. 4 is a flowchart showing an operation of the first image forming apparatus in the case of performing the double-sided print by the two image forming apparatuses included in the connected image forming system in FIG. 1.

FIG. 4 is a flowchart showing an operation of the image forming apparatus A in the case of performing double-sided print in conjunction with the image forming apparatus B.

In FIG. 4, when receiving an instruction of the connected double-sided operation from the print server 200 via the I/F unit 214, the job control unit 211 of the image forming apparatus A determines whether front side image data has been transmitted from the print server 200 (step S321). When receiving the front side image data, the job control unit 211 controls the sheet feeding unit (the sheet cassettes 109, 110, etc.) so as to supply a recording sheet to the recording unit 213 (step S322) to start image formation.

Next, the job control unit 211 controls the record control unit 212 so as to form the front side image on the recording sheet (step S324). Next, the job control unit 211 controls the record control unit 212 so that the recording unit 213 conveys the recording sheet (the image is formed on its first side) to the inverting path 122, and inverts the recording sheet (step S325). Then, the job control unit 211 controls the record control unit 212 so that the recording unit 213 transfers the inverted recording sheet to the image forming apparatus B via the connection path 113 of the image forming apparatus B (step S326).

The job control unit 211 determines whether the image formation of the last page notified by the print server 200 is completed (step S327). The job control unit 211 repeats the process from the step S322 to the step S326 until it is determined that the image formation of the last page is completed. When determining that the image formation of the last page in the image forming apparatus A is completed in the step S327, the job control unit 211 notifies the print server 200 of the image formation completion (step S328). Then, the job control unit 211 waits to receive the end notification of the connected double-sided operation from the print server 200 (step S329), and finishes the process when receiving the end notification.

Figure 5:
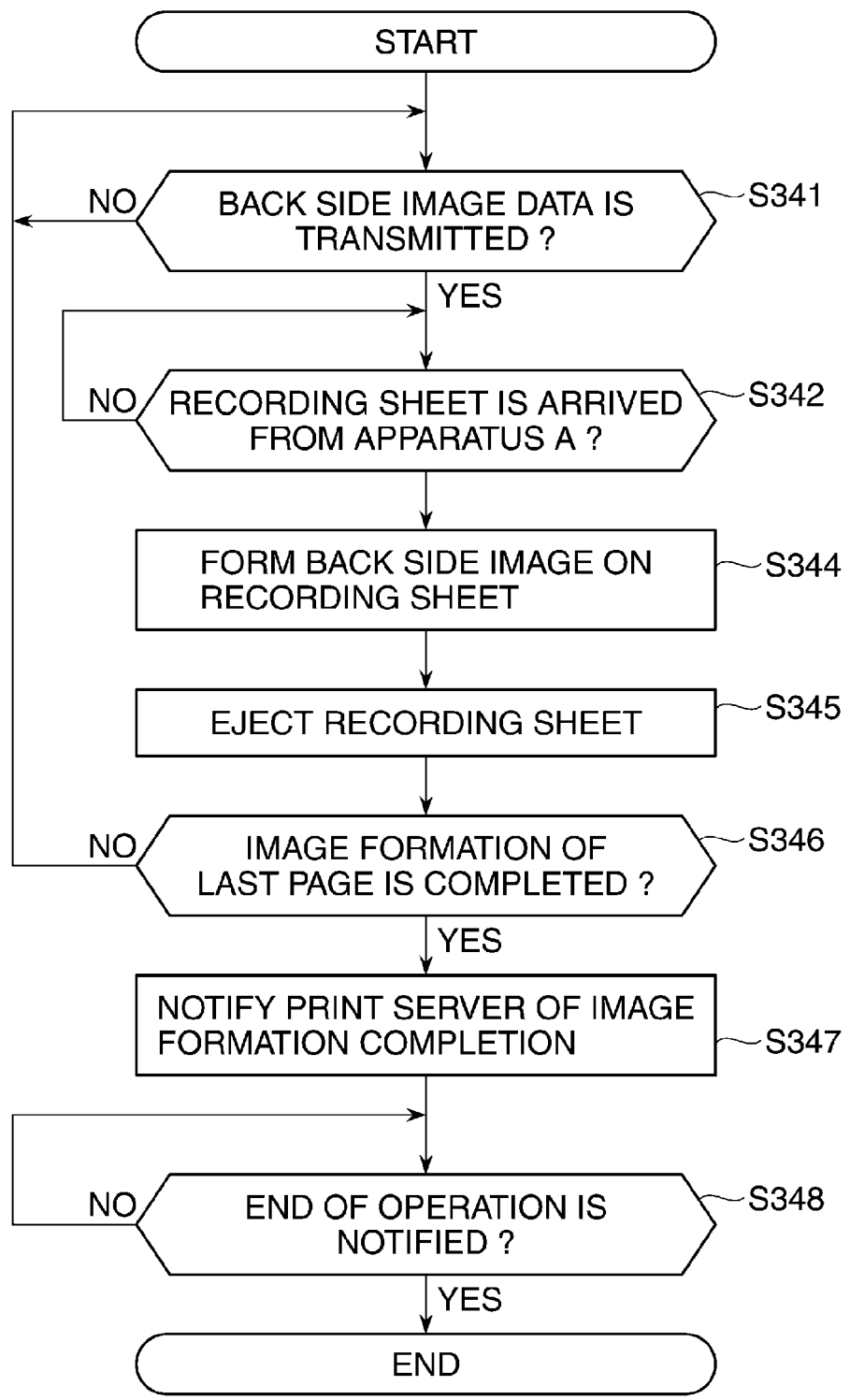
FIG. 5 is a flowchart showing an operation of the second image forming apparatus in the case of performing the double-sided print by the two image forming apparatuses included in the connected image forming system in FIG. 1.

FIG. 5 is a flowchart showing an operation of the image forming apparatus B in the case of performing double-sided print in conjunction with the image forming apparatus A.

In FIG. 5, when receiving an instruction of the connected double-sided operation from the print server 200 via the I/F unit 224, the job control unit 221 of the image forming apparatus B determines whether back side image data has been transmitted from the print server 200 (step S341). When receiving the back side image data, the job control unit 221 determines whether the target recording sheet for forming the back side image arrived from the image forming apparatus A (step S342). When determining that the recording sheet arrived from the image forming apparatus A in the step S342, the job control unit 221 controls the record control unit 222 so as to form the back side image on the second side of the recording sheet (step S344). Then, the job control unit 221 ejects the recording sheet by the ejection roller 123 from the apparatus to the post-processing device 500 (step S345).

The job control unit 221 determines whether the image formation of the last page notified by the print server 200 is completed (step S346). The job control unit 221 repeats the process from the step S341 to the step S345 until it is determined that the image formation of the last page is completed. When determining that the image formation of the last page in the image forming apparatus B is completed in the step S346, the job control unit 221 notifies the print server 200 of the image formation completion (step S347). Then, the job control unit 221 waits to receive the end notification of the connected double-sided operation from the print server 200 (step S348), and finishes the process when receiving the end notification. In this embodiment, the post-processing device 500, which is connected to the downstream side of the image forming apparatus B, applies a post-process succeedingly to the recording sheet, and then printed matter is completed.

Thus, the image forming apparatus A forms a front side image on a first side of a recording sheet, inverts the recording sheet on which the front side image is formed, and transfers the inverted recording sheet to the image forming apparatus B. The image forming apparatus B forms a back side image on a second side of the recording sheet. This enables to increase the productivity of the double-sided print operation.

Next, the composite print operation using the connected image forming apparatuses A and B will be described with reference to the flowcharts in FIG. 6 through FIG. 8. In the composite print operation by the connected image forming apparatuses A and B (referred to as a connected composition operation, hereafter), the image forming apparatus A prints a main image on an one side of a recording sheet, and the image forming apparatus B prints an auxiliary image on the same side of the recording sheet to compose the images. For example, when an image comprises a photograph and a text, the photograph is the main image and the text is the auxiliary image.

Figure 6:
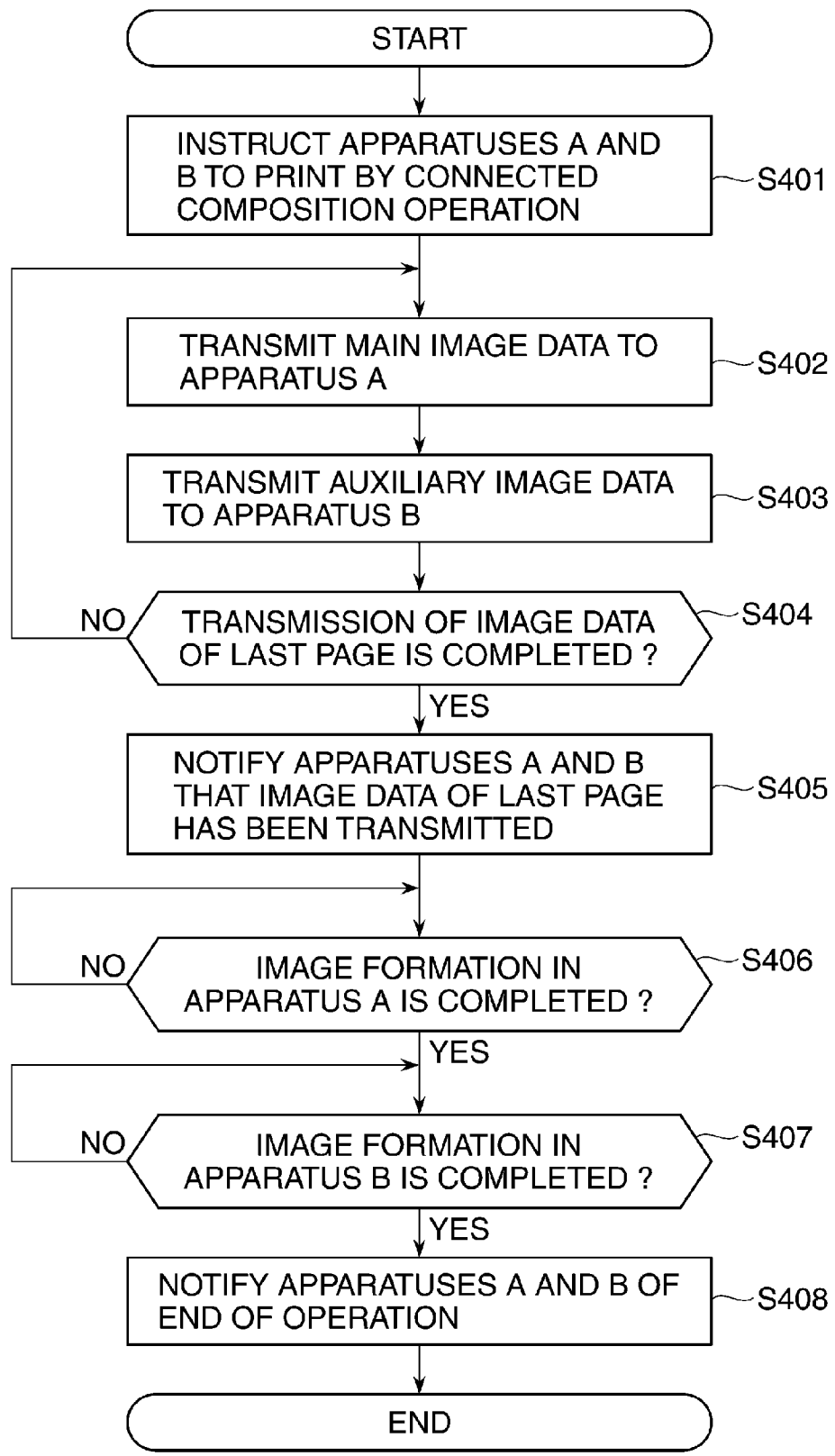
FIG. 6 is a flowchart showing an operation of the print server in the case of performing composite print using the two image forming apparatuses included in the connected image forming system in FIG. 1.

FIG. 6 is a flowchart showing an operation of the print server in the case of performing the composite print using the connected image forming apparatuses A and B.

In FIG. 6, the CPU 201 of the print server 200 instructs the image forming apparatus A and the image forming apparatus B to print by the connected composition operation first (step S401). Then, the CPU 201 transmits main image data, which is included in composite print data to be printed by the connected composition operation, to the image forming apparatus A at the upstream side (step S402). In the same manner, the CPU 201 transmits auxiliary image data to the image forming apparatus B at the downstream side (step S403). Then, the CPU 201 determines whether the transmission of the image data of the last page of the print job is completed (step S404), and repeats to transmit image data in the steps S402 and S403 until the transmission of the image data of the last page of the print job is completed.

When determining that the transmission of the image data of the last page is completed in the step S404, the CPU 201 notifies the image forming apparatuses A and B that the transmission of the image data of the last page has been completed (step S405). Then, the CPU 201 waits to receive a notification of image formation completion from the image forming apparatus A (step S406), and waits to receive a notification of image formation completion from the image forming apparatus B (step S407). When receiving the notifications of the image formation completion from both of the image forming apparatuses A and B, the CPU 201 notifies the image forming apparatuses A and B of the end of the connected composition operation (step S408), and finishes the process.

Figure 7:
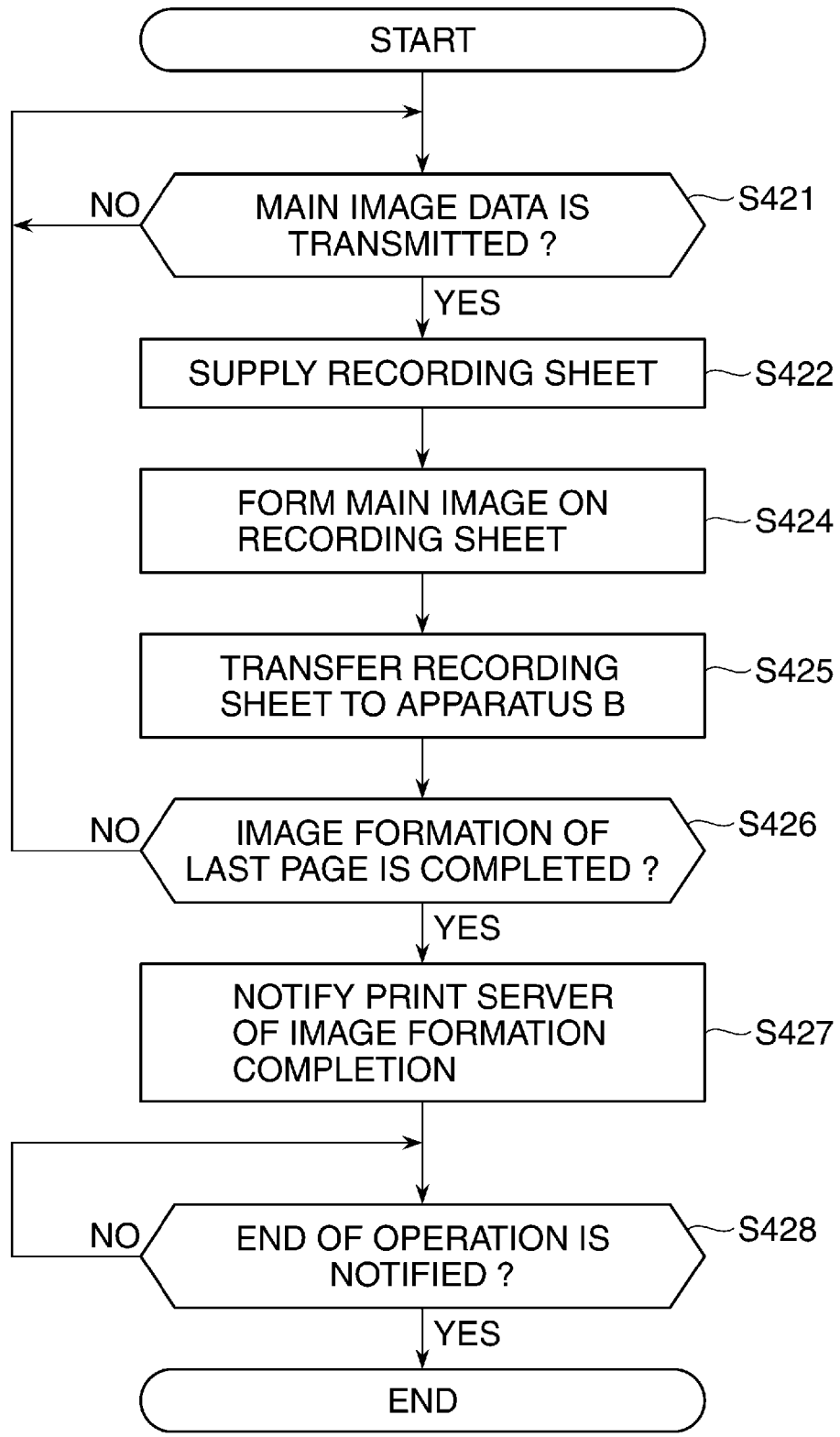
FIG. 7 is a flowchart showing an operation of the first image forming apparatus in the case of performing the composite print by the two image forming apparatuses included in the connected image forming system in FIG. 1.

FIG. 7 is a flowchart showing an operation of the image forming apparatus A in the case of performing composite print.

In FIG. 7, when receiving an instruction of the connected composition operation from the print server 200 via the I/F unit 214, the job control unit 211 of the image forming apparatus A determines whether main image data has been transmitted from the print server 200 (step S421). When receiving the main image data, the job control unit 211 controls the sheet feeding unit (the sheet cassettes 109, 110, etc.) so as to supply a recording sheet to the recording unit 213 (step S422) to start image formation.

Next, the job control unit 211 controls the record control unit 212 so as to form the main image on the recording sheet (step S424). Next, the job control unit 211 controls the record control unit 212 so that the recording unit 213 conveys the recording sheet on which the main image is formed to the ejection roller 123 without inverting, and transfers the recording sheet to the image forming apparatus B via the connection path 113 of the image forming apparatus B (step S425).

The job control unit 211 determines whether the image formation of the last page notified by the print server 200 is completed (step S426). The job control unit 211 repeats the series of operations from the step S422 to the step S425 until it is determined that the image formation of the last page is completed. When determining that the image formation of the last page in the image forming apparatus A is completed in the step S426, the job control unit 211 notifies the print server 200 of the image formation completion (step S427). Then, the job control unit 211 waits to receive the end notification of the connected composition operation from the print server 200 (step S428), and finishes the process when receiving the end notification.

Figure 8:
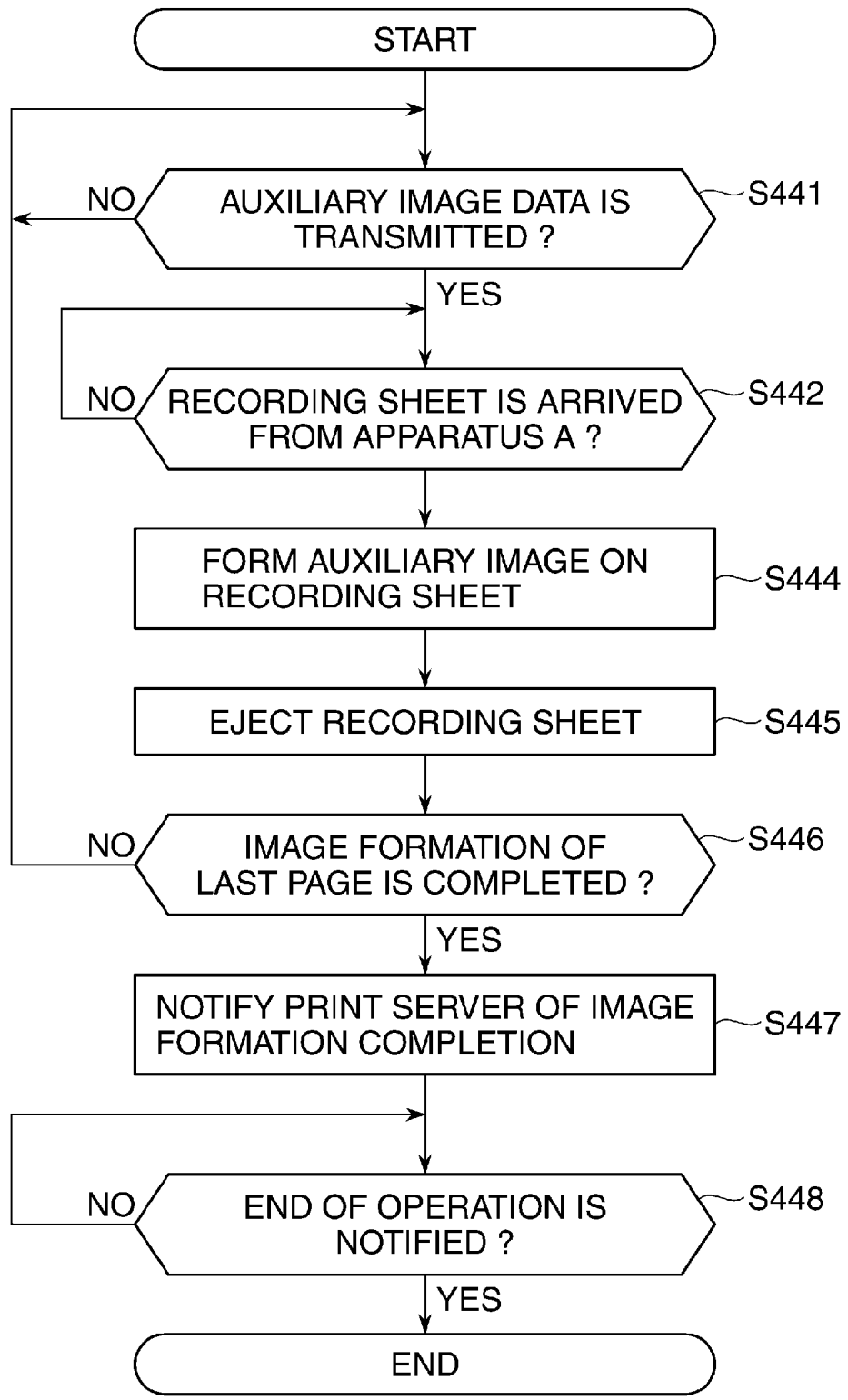
FIG. 8 is a flowchart showing an operation of the second image forming apparatus in the case of performing the composite print by the two image forming apparatuses included in the connected image forming system in FIG. 1.

FIG. 8 is a flowchart showing an operation of the image forming apparatus B in the case of performing composite print.

In FIG. 8, when receiving an instruction of the connected composition operation from the print server 200 via the I/F unit 224, the job control unit 221 of the image forming apparatus B determines whether auxiliary image data has been transmitted from the print server 200 (step S441). When receiving the auxiliary image data, the job control unit 221 determines whether the target recording sheet for forming the auxiliary image arrived from the image forming apparatus A (step S442). When determining that the recording sheet arrived from the image forming apparatus A in the step S442, the job control unit 221 controls the record control unit 222 so as to form the auxiliary image on the side on which the main image is formed of the recording sheet (step S444). Then, the job control unit 221 inverts the recording sheet, and ejects it from the ejection roller 123 to the post-processing device 500 (step S445).

The job control unit 221 determines whether the image formation of the last page notified by the print server 200 is completed (step S446). The job control unit 211 repeats the series of operations from the step S441 to the step S445 until it is determined that the image formation of the last page is completed. When determining that the image formation of the last page in the image forming apparatus B is completed in the step S446, the job control unit 221 notifies the print server 200 of the image formation completion (step S447). Then, the job control unit 221 waits to receive the end notification of the connected composition operation from the print server 200 (step S448), and finishes the process when receiving the end notification.

Thus, the image forming apparatus A forms a main image on a recording sheet, and transfers the recording sheet on which the main image is formed to the image forming apparatus B as-is without inverting. The image forming apparatus B forms an auxiliary image on the same side as the side on which the main image is formed of the recording sheet. As a result, the composite image is formed. This enables to increase the productivity of the composite print operation, even when the image formation is divided into two stages because the toner quantity in the overlapping area of the main image and the auxiliary image is too large to be fixed completely by one fixing.

Next, a process for determining whether print operations of the connected image forming apparatuses A and B are able to continue will be described with reference to a flowchart in FIG. 9.

Figure 9:
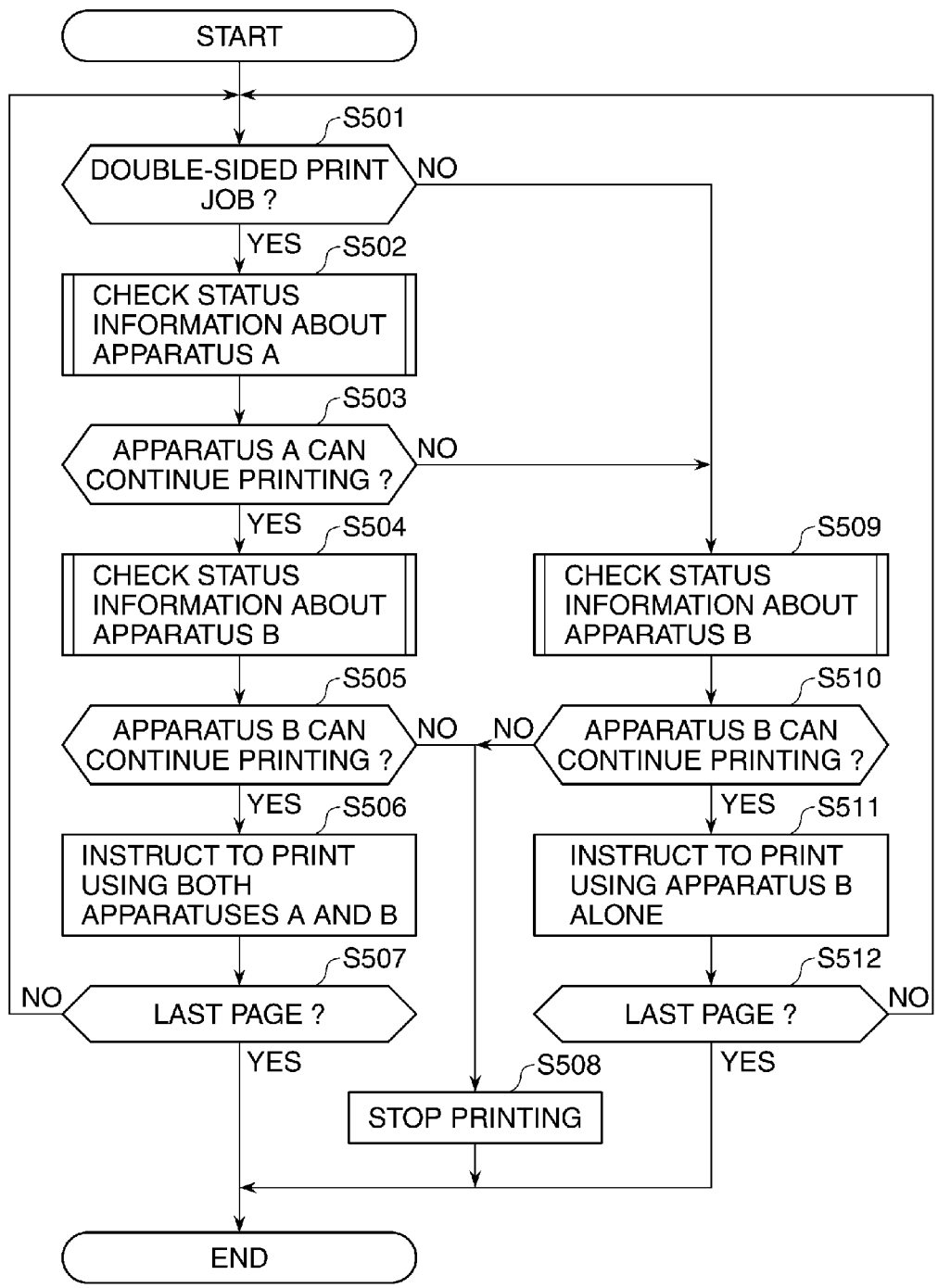
FIG. 9 is a flowchart showing a process for determining whether print operations in the two image forming apparatuses included in the connected image forming system in FIG. 1 are able to continue based on status information.

FIG. 9 is a flowchart showing the process for determining whether print operations in the image forming apparatuses A and B are able to continue based on status information.

In FIG. 9, when starting the process, the CPU 201 of the print server 200 determines whether a issued print job is a double-sided print job that prints on the both (front and back) sides of a recording sheet or an one side print job that prints only on one side of a recording sheet (step S501). When determining that the print job is a double-sided print job, the CPU 201 checks status information about the image forming apparatus A first (step S502) in order to determine whether both the image forming apparatuses A and B are usable collaboratively. When determining that the print job is not a double-sided print job (when it is determined as a one side print job), the CPU 201 checks only the status information about the image forming apparatus B connected at the downstream side (step S509) because both the image forming apparatuses are not used.

In this embodiment, the status information includes the residual number of recording sheets in the sheet feeding units (the sheet paper cassettes 109, 110, etc.), the toner residual quantity in the toner supply unit 101, and the waste toner quantity in the waste toner container of each cleaner. The status information includes the size and the basis weight of the recording sheet in each paper feeding unit. The status information is transmitted from each of the image forming apparatuses A and B to the CPU 201 of the print server 200 via the I/F unit 204.

The CPU 201 determines whether the image forming apparatus A of which the status information is checked in the step S502 is in a print continuable condition (step S503). When determining that the image forming apparatus A is in the print continuable condition, the CPU 201 checks the status information about the image forming apparatus B that operates to form an image in collaboration with the image forming apparatus A (step S504). When determining that the image forming apparatus A is in the print discontinuable condition, the CPU 201 checks the status information about the image forming apparatus B to execute the double-sided print job by the image forming apparatus B alone (step S509).

The CPU 201 determines whether the image forming apparatus B of which the status information has been checked in the step S504 is in a print continuable condition (step S505). When it is determined that the image forming apparatus B is in the print continuable condition, the collaborated image formation using both the image forming apparatuses A and B is possible. Therefore, the CPU 201 instructs both the image forming apparatuses A and B to execute the double-sided print job using both the apparatuses (step S506).

Then, the CPU 201 determines whether the recording sheet currently printed is the last page (step S507). When determining that it is the last page, the CPU 201 finishes this process.

When determining that it is not the last page, the CPU 201 returns the process to the S501, and repeats the process from the step S501.

Since the double-sided print job cannot be executed when it is determined that the image forming apparatus B is in the print discontinuable condition in the step S505, the CPU 201 stops the print operation (step S508), and finishes this process.

As mentioned above, when it is determined that the print job is not a double-sided print job (NO in the step S501), or when it is determined that the image forming apparatus A is in the print discontinuable condition (NO in the step S503) even if the print job is a double-sided print job, the CPU 201 checks the status information about the image forming apparatus B (step S509).

Next, the CPU 201 determines whether the image forming apparatus B of which the status information has been checked in the step S509 is in the print continuable condition (step S510). When determining that the image forming apparatus B is in the print continuable condition, the CPU 201 instructs the image forming apparatus B to execute an one side print job or a double-sided print job by using the image forming apparatus B alone (step S511). When determining that the image forming apparatus A cannot continue to print as mentioned above, the CPU 201 shifts the image forming apparatus A to the power saving mode, and executes a print job by the image forming apparatus B.

Then, the CPU 201 determines whether the recording sheet currently printed is the last page (step S512). When determining that it is the last page, the CPU 201 finishes this process. When determining that it is not the last page, the CPU 201 returns the process to the S501, and repeats the process from the step S501.

Since not only the double-sided print job but also the one side print job cannot be executed when it is determined that the image forming apparatus B is in the print discontinuable condition in the step S510, the CPU 201 stops the print operation (step S508), and finishes this process.

Next, a process by which the print server 200 determines status information about the image forming apparatuses A and B will be described with reference to a flowchart in FIG. 10. The process in FIG. 10 is called and executed in the steps S502, S504, and S509 in FIG. 9.

Figure 10:
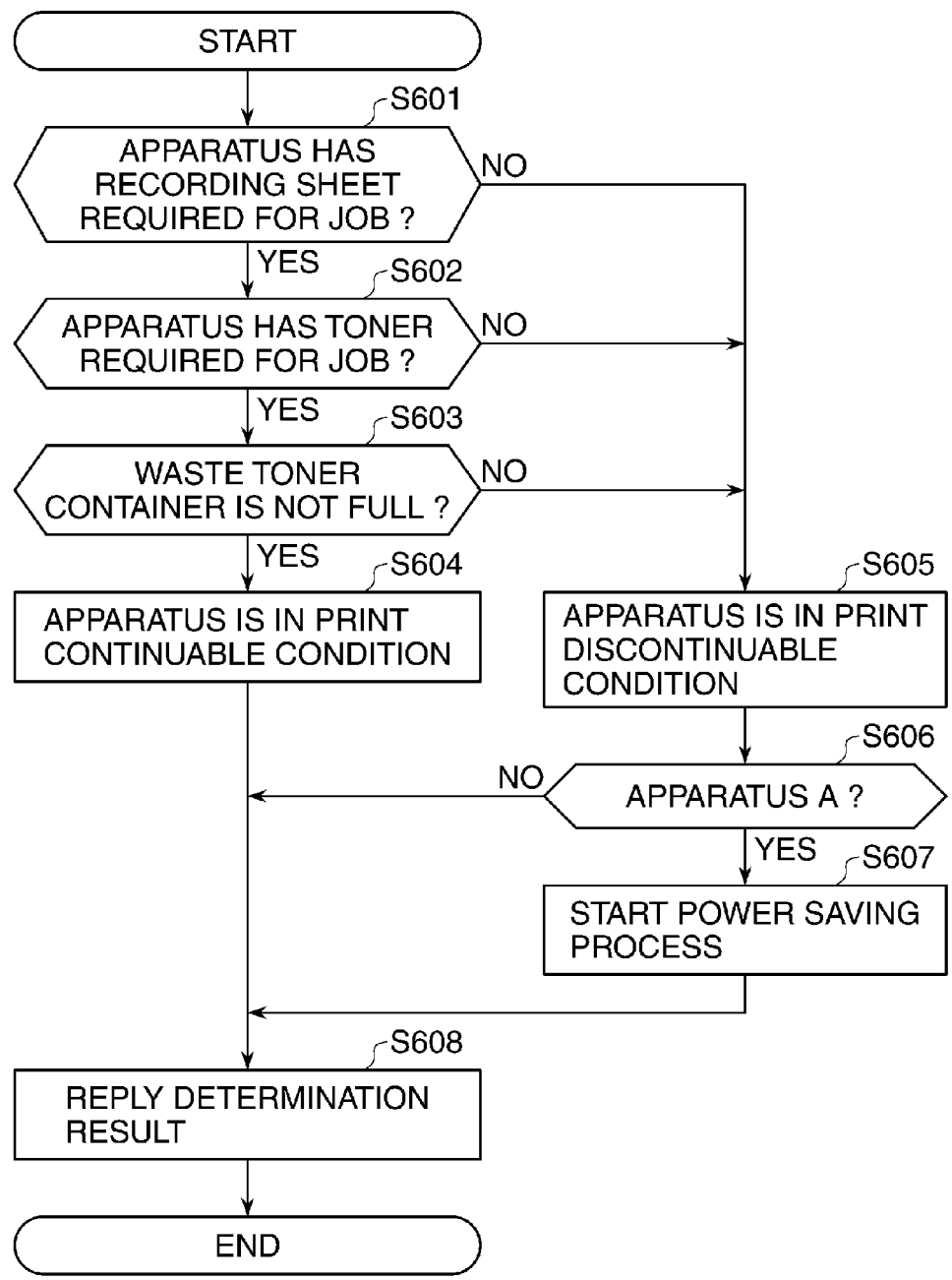
FIG. 10 is a flowchart showing a process for acquiring the status information about the two image forming apparatuses included in the connected image forming system in FIG. 1.

FIG. 10 is a flowchart showing a process for determining the status information about the image forming apparatuses A and B.

Since the process shown in FIG. 10 is common to the image forming apparatus A and the image forming apparatus B, these apparatuses are only written as the image forming apparatus in the following description. When starting the process, the CPU 201 of the print server 200 determines whether the image forming apparatus has a recording sheet required for the job issued to the image forming apparatus (step S601). The recording sheet required for the job is a recording sheet about which the status information showing the size and basis weight of the recording sheet agrees with the job concerned. Each image forming apparatus notifies the CPU 201 of the status information showing the size and basis weight of the recording sheet, the status information showing the toner residual quantity, and the status information showing the collected quantity of waste toner, via the I/F unit 204 of the print server 200.

When it is determined that the apparatus has no recording sheet required for the job, the process proceeds to step S605. When determining that the apparatus has the recording sheet required for the job, the CPU 201 determines whether the apparatus has the toner required for the issued job (step S602). The toner required for the job means the toners of yellow, cyan, magenta, and black in the case of a full color print job, or the black toner in the case of a monochrome print job. When it is determined that the apparatus has no toner required for the job, the process proceeds to step S605. When it is determined that the apparatus has the toner required for the job, the CPU 201 determines whether the waste toner container is not in the full condition (a condition where the waste toner reaches the predetermined quantity) in step S603. In the case of a full color print, the waste toner containers of the cleaners 177 of yellow, cyan, magenta, and black and a waste toner container of the cleaner 188 are checked. In the case of a monochrome print, the waste toner container of the cleaner 177k of black, and the waste toner container of the cleaner 188 are checked.

When it is determined that the waste toner container is in the full condition, the process proceeds to step S605. When it is determined that the waste toner container is not in the full condition, the CPU 201 determines that the image forming apparatus is in the print continuable condition (step S604), and replies a determination result showing the print continuable condition to the print continuous determination process in FIG. 9 (step S608). This finishes the process.

When determining that the apparatus has no recording sheet required for the job (NO in the step S601), that the apparatus has no toner required for the job (NO in the step S602), or that the waste toner container is in the full condition (NO in the step S603), the CPU 201 determines that the image forming apparatus is in the print discontinuable condition (step S605). Next, the CPU 201 determines whether the image forming apparatus in the print discontinuable condition is the image forming apparatus A at the upstream side (step S606).

When determining that the image forming apparatus A is in the print discontinuable condition, the CPU 201 starts a power saving process that shifts the image forming apparatus A to a power saving mode (step S607). The details of the power saving process will be mentioned latter with reference to FIG. 11. Then, the CPU 201 replies the determination result showing the print discontinuable condition to the print continuous determination process in FIG. 9 (step S608). When determining that the image forming apparatus in the print discontinuable condition is not the image forming apparatus A, the CPU 201 replies the determination result showing the print discontinuable condition to the print continuous determination process in FIG. 9 (step S608). This finishes the process.

Next, the power saving process in which shift to the power saving mode and cancel of the power saving mode are determined during execution of the job by the image forming apparatus A will be described with reference to a flowchart in FIG. 11.

Figure 11:
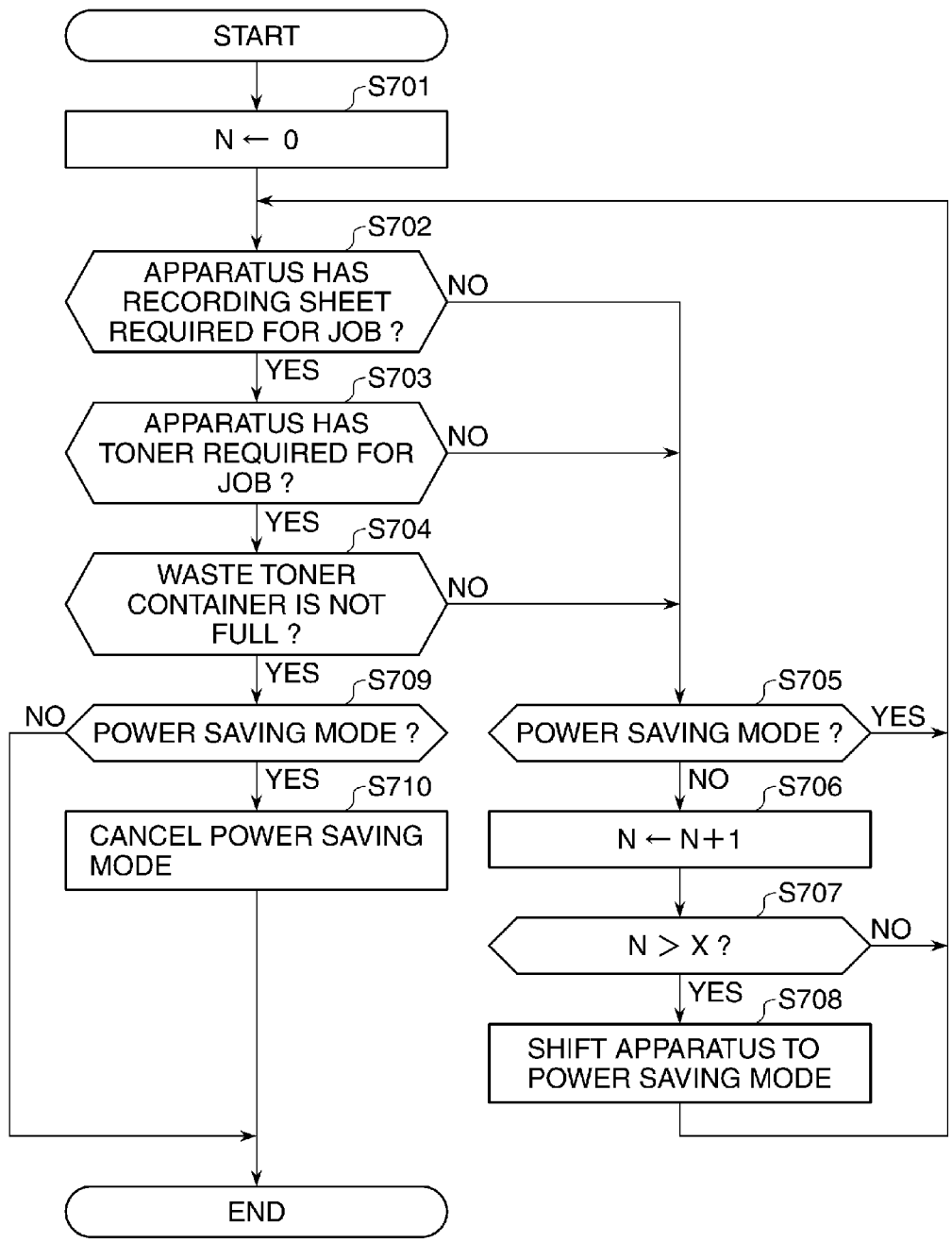
FIG. 11 is a flowchart showing a power saving process during execution of a job by the first image forming apparatus included in the connected image forming system in FIG. 1.

FIG. 11 is a flowchart showing the power saving process during execution of the job by the image forming apparatus A. The process shown in FIG. 11 starts in the step S607 in FIG. 10.

In FIG. 11, the CPU 201 of the print server 200 clears a timeout counter (timer) N to zero (step S701). The timeout counter N is used to measure lapsed time from the time when it is determined that the image forming apparatus A cannot continue to print. Here, the CPU 201 determines whether the apparatus is able to continue to print as follows. The CPU 201 determines whether the apparatus has a recording sheet required for the job (step S702), determines whether the apparatus has a toner required for the job (step S703), and determines whether a waste toner container is not in the full condition (step S704). That is, the CPU 201 checks whether the cause of the print discontinuable condition has been solved. The recording sheet required for the job in the step S702 is a recording sheet of the size and basis weight designated by the job.

When determining that the apparatus is in the print discontinuable condition in one of the steps S702, S703, and S704, the CPU 201 determines whether the image forming apparatus A is in the power saving mode (step S705). When determining that the image forming apparatus A is already in the power saving mode, the CPU 201 returns the process to the step S702, and repeatedly checks whether the cause of the print discontinuable condition has been solved. When determining that the image forming apparatus A is not in the power saving mode, the CPU 201 increments the timeout counter N by one (step S706).

Next, the CPU 201 compares the timeout counter N with a time out value X (a predetermined time) in step S707. When determining that the timeout counter N exceeds the time out value X, the CPU 201 shifts the image forming apparatus A to the power saving mode (step S708), returns the process to the step S702, and repeatedly checks whether the cause of the print discontinuable condition has been solved. When determining that the timeout counter N does not exceed the time out value X, the CPU 201 returns the process to the step S702, and repeatedly checks whether the cause of the print discontinuable condition has been solved.

When determining that the apparatus is not in the print discontinuable condition in all the steps S702, S703, and S704, the CPU 201 determines whether the image forming apparatus A is in the power saving mode (step S709). When determining that the image forming apparatus A is in the power saving mode, the CPU 201 cancels the power saving mode (step S710), and finishes this process. When determining that the image forming apparatus A is not in the power saving mode, the CPU 201 finishes the power saving process as-is.

Next, a power saving process that regularly determines whether the image forming apparatus A is able to continue to print will be described with reference to a flowchart in FIG. 12.

Figures 12, 13:
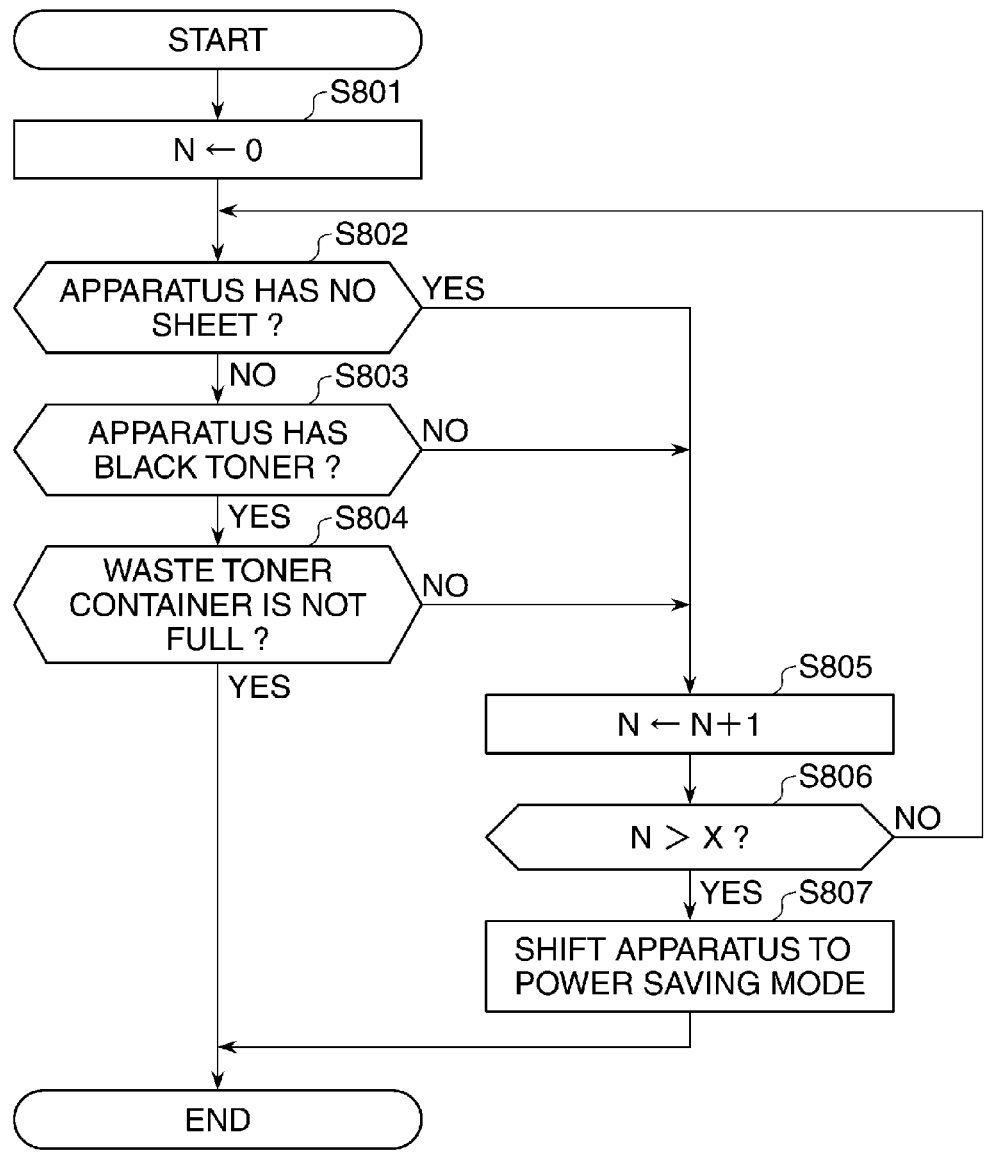
FIG. 12 is a flowchart showing a power saving process that is regularly determined for the first image forming apparatus included in the connected image forming system in FIG. 1.
FIG. 13 is a view showing productivities of one side print and double-sided print by the image forming apparatus.

FIG. 12 is a flowchart showing the power saving process that is regularly determined for the image forming apparatus A.

In FIG. 12, when starting the process, the CPU 201 of the print server 200 clears a timeout counter N to zero (step S801). Next, the CPU 201 determines whether there is no recording sheet in all the sheet feeding units (the sheet paper cassettes 109 and 110, the manual feeder 111, the double-sided conveyance path 112) of the image forming apparatus A (step S802). When it is determined that there is no recording sheet in all the sheet feeding units, the process proceeds to step S805. That is, when there is no recording sheet in all the sheet feeding units, it is determined that the image forming apparatus A cannot print even one recording sheet. When it is determined that there is a recording sheet in one of the sheet feeding units, the process proceeds to step S803.

Next, the CPU 201 determines whether the toner supply unit 101 of the image forming apparatus A contains black toner (step S803). When it is determined that the toner supply unit 101 does not contain black toner, the process proceeds to step S805. That is, when the toner supply unit 101 of the image forming apparatus A does not contain the black toner, the image forming apparatus A cannot print even one recording sheet in either cases of a full color print job and a monochrome print job. When it is determined that the toner supply unit 101 contains the black toner, the process proceeds to step S804.

Next, the CPU 201 determines whether the waste toner container of the image forming apparatus A is not in the full condition (step S804). When it is determined that the waste toner container is in the full condition, the process proceeds to step S805. That is, when the waste toner container is in the full condition, it is determined that the image forming apparatus A cannot print even one recording sheet. When it is determined that the waste toner container is not in the full condition, the process is finished.

Since the CPU 201 can determine whether the image forming apparatus A cannot print even one recording sheet regardless of a print job, which is issued to the image forming apparatus A, in the step S802, S803, or S804, it is regularly determined whether the apparatus can continue to print. When it is determined that the image forming apparatus A cannot continue to print in the step S802, S803, or S804, the CPU 201 increments the timeout counter N by one (step S805).

Next, the CPU 201 compares the timeout counter N with a time out value X (a predetermined time) in step S806. When determining that the timeout counter N exceeds the time out value X, the CPU 201 shifts the image forming apparatus A to the power saving mode (step S807), and finishes the process. When determining that the timeout counter N does not exceed the time out value X, the CPU 201 returns the process to the step S802, and repeatedly checks whether the cause of the print discontinuable condition has been solved. When it is determined that the apparatus is in the print continuable condition in all of the steps S802, S803, and S804, the power saving process is finished.

Next, operations of a double-sided print and a composite print executed by the image forming apparatus B alone when the image forming apparatus A is in the print discontinuable condition will be described.

First, the operation of the image forming apparatus B at the time when executing the double-sided print will be described. When the image forming apparatus A is determined to be in the print discontinuable condition (NO in the step S503 in FIG. 9), the CPU 201 of the print server 200 checks the status information about the image forming apparatus B (the step S509 in FIG. 9) to determine whether the image forming apparatus B is in the print continuable condition (the step S510 in FIG. 9). When determining that the image forming apparatus B is in the print continuable condition (YES in the step S510 in FIG. 9), the CPU 201 instructs the record control unit 222 of the image forming apparatus B to execute the double-sided print by the image forming apparatus B alone (the step S511 in FIG. 9). The record control unit 222 conveys a recording sheet from either of the sheet paper cassettes 109 and 110 to the secondary transfer section 106, controls the secondary transfer section 106 to transfer an image to the first side of the recording sheet, and controls the fixing unit 107 to fix the transferred image in order to form a front side image. The record control unit 222 inverts the recording sheet by the inverting path 122, re-conveys the recording sheet to the secondary transfer section 106, and forms a back side image on the second side of the recording sheet. Then, the record control unit 222 sends the recording sheet, which finished the double-sided print, to the post-processing device 500.

On the other hand, the composite print by the image forming apparatus B alone is prohibited due to a structural reason of the image forming apparatus B in this embodiment. That is, the inverting path 122 of the image forming apparatus B is used to invert the recording sheet and to re-convey it to the secondary transfer section 106, but cannot convey the recording sheet to the secondary transfer section 106 without inverting it. Therefore, the composite print cannot be executed by the image forming apparatus B alone. If the image forming apparatus B has a conveyance path that can re-convey a recording sheet to the secondary transfer section 106 without inverting it, the composite print can be executed by re-conveying the recording sheet to the secondary transfer section 106 without inverting it to form an auxiliary image on a first side of the recording sheet after forming a main image on the first side of the recording sheet.

As described above, the connected image forming system of this embodiment has the following operation effects. When the image forming apparatus A at the upstream side (the first apparatus) enters in the print discontinuable condition because a recording sheet cannot be supplied due to lack of recording sheet, because a toner is empty, or because a waste toner container is full, a print job cannot be executed in collaboration with the image forming apparatus B at the downstream side (the second apparatus). Therefore, there is no need of continuing supplying electric power to the image forming apparatus A at the upstream side, and the shift of the image forming apparatus A to the power saving mode reduces electric power energy. Usually, a stand-alone image forming apparatus that is not connected to another image forming apparatus keeps a standby condition without shifting to the power saving mode, even in the case of lack of recording sheet or toner, assuming that a recording sheet or a toner is supplied immediately.

Since the connected image forming system of this embodiment is provided with the image forming apparatus B that can execute a print job at the downstream side within the same system, the image forming apparatus A at the upstream side keeps the power saving mode until the image forming apparatus A is ready to execute the print job.

That is, when the image forming apparatus A at the upstream side cannot execute the print job in collaboration with the image forming apparatus B at the downstream side due to lack of recording sheet or toner, or due to full of waste toner, the print operation is executed by the image forming apparatus B alone, and the image forming apparatus A shifts to the power saving mode. Accordingly, this enables to achieve both of the continuous execution of the print job, and the energy saving by reducing the vain power consumption.

Although the above-mentioned embodiment determines whether the connected image forming apparatuses A and B can continue to print based on whether a print job is a double-sided print job that forms images on both (front and back) sides of a recording sheet, the present invention is not limited to this. The similar process can be applied to a composite print job that composes a main image formed on a recording sheet by the image forming apparatus A with an auxiliary image formed by the image forming apparatus B. In the composite print job, formation of a regular image (a main image) and formation of a composing image (an auxiliary image) are shared between the image forming apparatus A and the image forming apparatus B, and a composing process is executed by multiple composition. When the image forming apparatus A is in the print discontinuable condition at the time, the composite print job is continued by a memory composition that composes images on a memory by the image forming apparatus B alone.

Although the above-mentioned embodiment determines whether the connected image forming apparatuses A and B can continue to print based on the status information, the present invention is not limited to this. The propriety of the print continuation of the image forming apparatus A and the image forming apparatus B may be determined based on job information and status information. The job information includes information about a color mode (a full color mode or a monochrome mode) of a print job executed by the image forming apparatus and information about a type (a size and basis weight) of a recording sheet used by a print job executed by the image forming apparatus.

In the above-mentioned embodiment, when the image forming apparatus B at the downstream side is in the print discontinuable condition, the print operation stops in the step S505 in FIG. 9. However, even if the image forming apparatus B cannot continue to print, as long as it can convey a recording sheet, a double-sided print job may be continued by the image forming apparatus A alone. In such a case, the image forming apparatus B may convey the recording sheet from the image forming apparatus A, without supplying electric power to the fixing unit and the elements required for forming an image. Although the above-mentioned embodiment describes the control while executing the double-sided/composite print job by the two image forming apparatuses A and B, the present invention can be applied when starting the double-sided/composite print job by the two apparatuses. Namely, the print server 200 shall determine whether the double-sided/composite print job can be executed by the image forming apparatus A and the image forming apparatus B before starting the print job.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-163251, filed on Jul. 20, 2010, which is hereby incorporated by reference herein in its entirety.

What is claimed is:

1. An image formation control apparatus that executes a double-sided print job that forms a front side image on a first side of a recording sheet and forms a back side image on a second side of the recording sheet by controlling a first image forming apparatus and a second image forming apparatus connected to a downstream side of the first image forming apparatus in series, comprising:

a determination unit configured to determine whether the first image forming apparatus is able to execute a print job based on status information about the first image forming apparatus; and a control unit configured in the case where the double-sided print job is executed, to shift the first image forming apparatus to a power saving mode and to control the second image forming apparatus to form both of the front side image and the back side image on the first and second sides of the recording sheet respectively when said determination unit determines that the first image forming apparatus cannot execute the print job, and to control the first image forming apparatus to form the front side image on the first side of the recording sheet and the second image forming apparatus to print the back side image on the second side of the recording sheet when said determination unit determines that the first image forming apparatus can execute the print job.

2. The image formation control apparatus according to claim 1, wherein said determination unit determines whether the first image forming apparatus is able to execute the print job based on job information concerning the print job and the status information about the first image forming apparatus.

3. The image formation control apparatus according to claim 1, wherein the status information includes at least one of the residual number of recording sheets, a toner residual quantity, and a collected waste toner quantity in the first image forming apparatus.

4. The image formation control apparatus according to claim 1, wherein said determination unit determines that the first image forming apparatus is not able to execute the print job when the first image forming apparatus does not have a recording sheet or a toner required for the print job, or when a collected waste toner quantity reaches a predetermined quantity in the first image forming apparatus.

5. The image formation control apparatus according to claim 2, wherein the job information includes information showing whether the print job is a color print job or a monochrome print job, and information showing a type of recording sheet used by the print job.

6. The image formation control apparatus according to claim 1, further comprising a timer configured to measure lapsed time from the time when said determination unit determines that the first image forming apparatus cannot continue to print, and
wherein said control unit shifts the first image forming apparatus to the power saving mode when the lapsed time measured by said timer exceeds a predetermined time.

7. The image formation control apparatus according to claim 1, wherein said control unit cancels the power saving mode of the first image forming apparatus when said determination unit determines that the first image forming apparatus shifted to the power saving mode is able to execute the print job.

8. The image formation control apparatus according to claim 1, wherein the image formation control apparatus further executes a composite print job that forms and composes a main image and an auxiliary image on a first side of a recording sheet by controlling the first image forming apparatus and the second image forming apparatus, and wherein
in the case where the composite print job is executed, said control unit shifts the first image forming apparatus to the power saving mode and controls the second image forming apparatus to form both of the main image and the auxiliary image on the first side of the recording sheet to compose the main and auxiliary images when said determination unit determines that the first image forming apparatus cannot execute the print job; and controls the first image forming apparatus to form the main image on the first side of the recording sheet and the second image forming apparatus to form the auxiliary image on the first side of the recording sheet to compose the main and auxiliary images when said determination unit determines that the first image forming apparatus can execute the print job.

9. An image forming system comprising: the image formation control apparatus according to claim 1; a first image forming apparatus; and a second image forming apparatus connected to a downstream side of said first image forming apparatus.

10. An image formation control method for an image formation system that executes a double-sided print job that forms a front side image on a first side of a recording sheet and forms a back side image on a second side of the recording sheet by controlling a first image forming apparatus and a second image forming apparatus connected to a downstream side of the first image forming apparatus in series, the control method comprising:
a determination step of determining whether the first image forming apparatus is able to execute a print job based on status information about the first image forming apparatus; and
a control step of, in the case where the double-sided print job is executed, shifting the first image forming apparatus to a power saving mode and of controlling the second image forming apparatus to form both of the front side image and the back side image on the first and second sides of the recording sheet respectively when it is determined that the first image forming apparatus cannot execute the print job in said determination step, and to control the first image forming apparatus to form the front side image on the first side of the recording sheet and the second image forming apparatus to print the back side image on the second side of the recording sheet when said determination step determines that the first image forming apparatus can execute the print job.

11. The image formation control method according to claim 10, wherein it is determined whether the first image forming apparatus is able to execute the print job based on job information concerning the print job and the status information about the first image forming apparatus in said determination step.

12. A non-transitory computer-readable storage medium storing an image formation control program causing a computer to execute the control method for the image formation control apparatus according to claim 10.

* * * * *